US012602298B2

(12) United States Patent
Yang et al.

(10) Patent No.: US 12,602,298 B2
(45) Date of Patent: Apr. 14, 2026

(54) SELF-REPAIRABLE CHIP FOR SILENT DATA CORRUPTION ISSUES

(71) Applicant: Google LLC, Mountain View, CA (US)

(72) Inventors: Andy Yang, Cupertino, CA (US); Paul Richard Bonderson, III, Sunol, CA (US); Sandeep Bhatia, San Jose, CA (US); Boone Severson, Waunakee, WI (US); Sushma Honnavara-Prasad, Los Gatos, CA (US); Indranil Chakraborty, Mountain View, CA (US); Christopher Aaron Clark, Madison, WI (US); Matthew Leever Hedlund, Sun Prairie, WI (US); Shriram Nagarajan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/623,601

(22) Filed: Apr. 1, 2024

(65) Prior Publication Data

US 2025/0307090 A1     Oct. 2, 2025

(51) Int. Cl.
*G06F 11/20* (2006.01)
*G06F 11/27* (2006.01)

(52) U.S. Cl.
CPC .......... *G06F 11/2041* (2013.01); *G06F 11/27* (2013.01); *G06F 2201/805* (2013.01)

(58) Field of Classification Search
CPC .............................. G06F 11/2041; G06F 11/27
See application file for complete search history.

(56) References Cited

U.S. PATENT DOCUMENTS

| | | | |
|---|---|---|---|
| 6,718,494 B1 | 4/2004 | Jamil et al. | |
| 7,415,633 B2 | 8/2008 | Jamil et al. | |
| 7,644,347 B2 | 1/2010 | Alexander et al. | |
| 7,734,980 B2 | 6/2010 | Alexander et al. | |
| 8,073,668 B2 | 12/2011 | Kellington et al. | |
| 8,839,268 B2 | 9/2014 | Feehrer | |
| 9,009,569 B2 | 4/2015 | Taranta, II | |

(Continued)

OTHER PUBLICATIONS

N. P. Jouppi, G. Kurian, S. Li, P. Ma, R. Nagarajan, L. Nai, N. Patil, S. Subramanian, A. Swing, B. Towles, C. Young, X. Zhou, Z. Zhou, and D. Patterson, "TPU v4: An Optically Reconfigurable Super-computer for Machine Learning with Hardware Support for Embed-dings," In: Proceedings of the 50th Annual International Sympo-sium on Computer Architecture (ISCA '23), Association for Computing Machinery, New York, NY, USA, Article 82, pp. 1-14.

(Continued)

*Primary Examiner* — Jigar P Patel
(74) *Attorney, Agent, or Firm* — Lerner David LLP

(57) ABSTRACT

The disclosure provides a self-repairable chip for silent data corruption (SDC) issues. The self-repairable chip is config-ured to detect data corruption in a plurality of processing units, identifying the defective tiles of the processing units, and repairing the defective tiles by replacing the defective tiles with redundant rows or columns. The self-repairable chip is further configured to determine whether one or more logics where the data corruption occurred must work or may work and replace the defective tiles with redundant rows or columns when the logic where the data corruption occurred may work.

22 Claims, 6 Drawing Sheets

(56)  References Cited

U.S. PATENT DOCUMENTS

| | | | |
|---|---|---|---|
| 9,432,298 | B1 | 8/2016 | Smith |
| 9,734,920 | B2 | 8/2017 | Gorman et al. |
| 10,296,312 | B2 | 5/2019 | Shrivastava et al. |
| 10,579,473 | B2 | 3/2020 | Vanaparthy et al. |
| 11,314,594 | B2 | 4/2022 | Tang et al. |
| 11,640,334 | B2 | 5/2023 | Shah |
| 2013/0094817 | A1 * | 4/2013 | Oster .................. H03K 19/177 |
| | | | 385/89 |
| 2020/0183804 | A1 * | 6/2020 | Chen ..................... G06F 11/27 |
| 2021/0158889 | A1 * | 5/2021 | Parikh .................... G11C 29/38 |
| 2023/0016892 | A1 | 1/2023 | Grohoski et al. |
| 2023/0231573 | A1 * | 7/2023 | Sforzin .............. G06F 11/1012 |
| | | | 714/764 |
| 2023/0273811 | A1 * | 8/2023 | Mishaeli ............... G06F 9/3842 |
| | | | 718/102 |
| 2023/0297465 | A1 * | 9/2023 | Dattatraya Dixit ......................... |
| | | | G06F 11/0793 |
| | | | 714/33 |
| 2023/0409452 | A1 * | 12/2023 | Tonoyan ................. G06F 11/27 |

OTHER PUBLICATIONS

Extended European Search Report for European Patent Application No. 25166602.0 dated Aug. 13, 2025. 9 pages.

D. Abts, J. Kim, G. Kimmell, M. Boyd, K. Kang, S. Parmar, A. Ling, A. Bitar, I. Ahmed, and J. Ross, "The Groq Software-defined Scale-out Tensor Streaming Multiprocessor: From chips-to-systems architectural overview." Hot Chips 34 Symposium, 2022, 69 pages.

* cited by examiner

Computing Device 500

Processor(s) 512

Memory 514

Instructions 516

Data 518

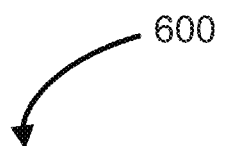

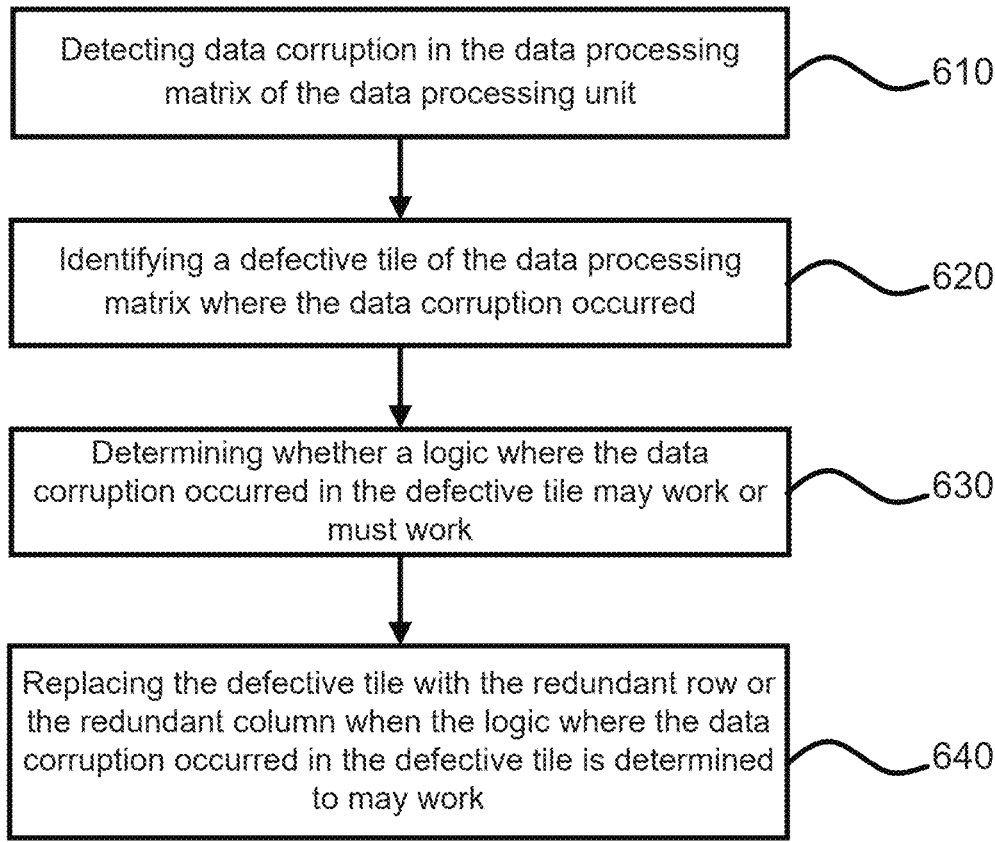

Detecting data corruption in the data processing matrix of the data processing unit — 610

Identifying a defective tile of the data processing matrix where the data corruption occurred — 620

Determining whether a logic where the data corruption occurred in the defective tile may work or must work — 630

Replacing the defective tile with the redundant row or the redundant column when the logic where the data corruption occurred in the defective tile is determined to may work — 640

FIG. 6

SELF-REPAIRABLE CHIP FOR SILENT DATA CORRUPTION ISSUES

BACKGROUND

Artificial intelligence (AI) and machine learning (ML) are widely acknowledged as the next high-tech engine of global economic growth. AI/ML silicon accelerator chips, such as tensor processing units (TPUs) and graphics processing units (GPUs), are the critical components of this advancement. However, silent data corruption (SDC) has emerged as a growing concern within the industry. As the name implies, SDC is silent without any detectable warnings. In the context of data centers, SDC can cause various issues, such as AI model training interruption, inaccurate or invalid models being provided to customers, data loss, financial loss, and operational disruptions for businesses. These issues significantly impact data center productivity, reliability, and customer confidence in cloud services. Additionally, addressing SDC incurs material and logistics costs to replace failed machines.

AI/ML accelerator chips, such as tensor processing units (TPUs) are application-specific integrated circuits (ASICs) for accelerating machine learning workloads. TPU chips are optimized to perform matrix operations quickly, making them ideal for machine learning workloads. When silent data corruption (SDC) is detected on these highly integrated chips, the affected chips are discarded at that point. If it is not possible to identify the specific defective chip causing the SDC errors, the entire machine with 4 to 8 AI/ML chips must be discarded, even if only one chip is defective and causing the SDC errors. These costs associated with SDC failures and chip replacement are inevitably transferred to end users, adding to the already high cost of AI/ML model training.

Currently, the industry approach to SDC handling is limited to detecting and screening out defective chips and machines. This involves adding design-for-test (DFT) checkpoints on the core die or performing SDC screening at both the chip and system or machine level during manufacturing. If these checks fail, the expensive chip is scrapped.

BRIEF SUMMARY

Aspects of the disclosure are directed to a self-repairable chip for silent data corruption (SDC) issues. The self-repairable chip is configured to detect data corruption in a plurality of processing units, identifying the defective tiles of the processing units, and replacing the defective tiles with redundant rows or columns of processing units. The self-repairable chip is further configured to determine whether one or more logic units where the data corruption occurred are critical, or "must work" for the chip to function, or whether the logic units are auxiliary, or "may work" to execute auxiliary functions but are not critical to the essential functions of the chip. When the defective logic units are determined to be "may work" logic units, the defective tiles can be replaced with redundant rows or columns of processing units.

An aspect of the disclosure provides for a device including: one or more processing cores including a plurality of processing units, at least one of the plurality of processing units including a data processing matrix arranged in a plurality of rows and columns, the data processing matrix including at least one of a redundant column or a redundant row of processing units, the processing core configured to: detect data corruption in the data processing matrix; identify a defective tile of the data processing matrix where the data corruption occurred; determine whether a defective logic unit in the defective tile is a critical logic unit or an auxiliary logic unit; and when the defective logic unit is the auxiliary logic unit, replace the defective tile with one of the redundant column or the redundant row.

In an example, the one or more processing cores are further configured to determine whether there is an available redundant column or redundant row and automatically replace the defective tile with the available redundant column or a redundant row.

In another example, the one or more processing cores are further configured to remap logic in the data processing matrix after replacing the defective tile with the available redundant column or row.

In yet another example, the one or more processing cores are further configured to run testing after remapping the logic in the data processing matrix, and confirm based on the testing whether the data processing matrix is fully functional.

In yet another example, the one or more processing cores are further configured to restore functionalities of the defective tile by blowing an e-fuse of the device.

In yet another example, the one or more processing cores are further configured to: execute one or more logic units in a processing tile of the data processing matrix; determine whether the next processing tile is a tile of the redundant row or column; and execute one or more logics in a next processing tile of the tile of the redundant row or column by bypassing the tile of the redundant row or column when the next processing tile is determined the tile of the redundant row or column.

In yet another example, critical logic units and auxiliary logic units perform independently. In yet another example, the device further comprises a plurality of bus and redundant bus. In yet another example, the processing core is further configured to replace a defective bus with the redundant bus when the defective bus is detected.

In yet another example, the one or more processing cores are configured to repair the defective tile multiple times during a lifetime of a processing core.

In yet another example, the one or more processing cores are configured to identify the defective tile of the data processing matrix by receiving information of the defective tile from tests for detection of silent data corruptions (SDCs). In yet another example, the data corruption is detected by one or more functional tests.

Another aspect of the disclosure provides for a method for repairing data corruption on a device, the method including: detecting, by one or more processing cores including a plurality of processing units, the data corruption in a data processing matrix of at least one of the plurality of processing units, wherein the data processing matrix is arranged in a plurality of rows and columns and the data processing matrix includes at least one of a redundant column or a redundant row of processing units; identifying, by one or more processing cores, a defective tile of the data processing matrix where the data corruption occurred; determining, by one or more processing cores, whether a defective logic unit in the defective tile is a critical logic unit or an auxiliary logic unit; and replacing, by one or more processing cores, the defective tile with one of the redundant column or the redundant row when the defective logic unit is the auxiliary logic unit.

In an example, the method further includes determining whether there is an available redundant column or redundant row, and automatically repairing the defective tile with the available redundant column or redundant row.

In another example, the method further includes restoring functionalities of the defective tile by blowing an e-fuse of the device.

In yet another example, the method further includes: executing, by one or more processing cores, one or more logics in a processing tile of the data processing matrix; determining, by one or more processing cores, whether the next processing tile is a tile of the redundant row or column; and executing, by one or more processing cores, one or more logics in a next processing tile of the tile of the redundant row or column by bypassing the tile of the redundant row or column when the next processing tile is determined the tile of the redundant row or column.

In yet another example, critical logic units and auxiliary logic units perform independently.

In yet another example, the device further comprises a plurality of bus and redundant bus. In yet another example, the method further includes replacing a defective bus with the redundant bus when the defective bus is detected.

In yet another example, replacing the defective tile with one of the redundant columns or the redundant row is performed multiple times during a lifetime of a processing core.

In yet another example, identifying the defective tile of the data processing matrix comprises receiving information of the defective tile from tests for detection of silent data corruptions (SDCs). In yet another example, the data corruption is detected by one or more functional tests.

BRIEF DESCRIPTION OF THE DRAWINGS

FIG. 6 depicts a flow diagram of an example process for repairing SDC issues via a self-repairable chip according to aspects of the disclosure.

DETAILED DESCRIPTION

Figure 1:
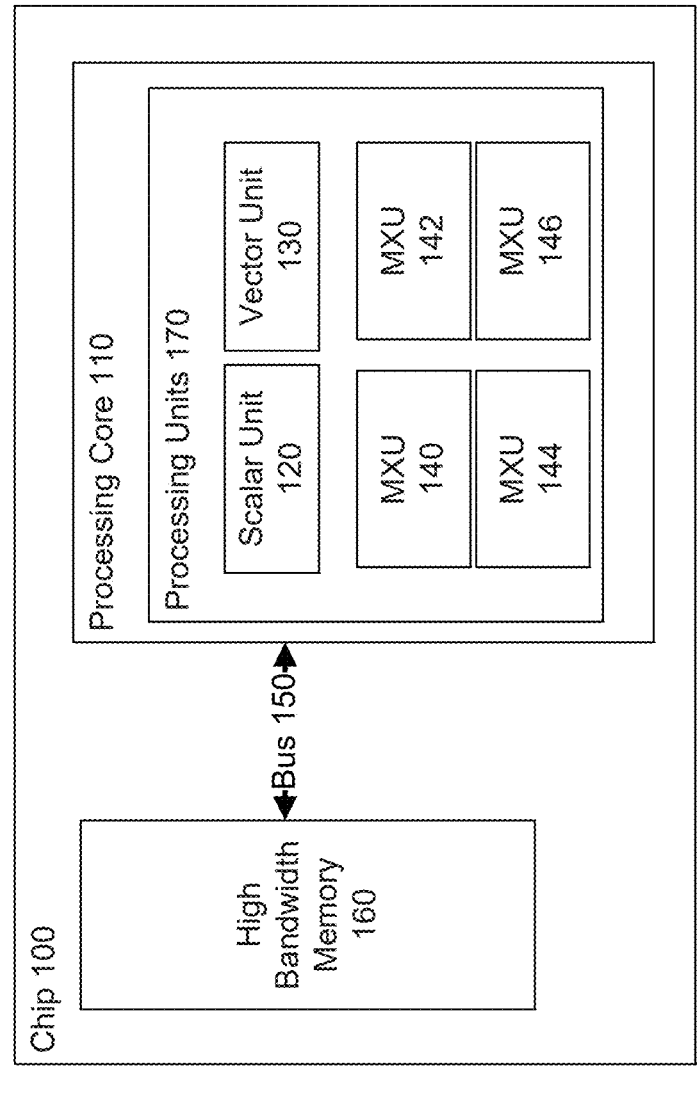
FIG. 1. depicts a block diagram of an example chip according to aspects of the disclosure.

Generally disclosed herein are implementations for a chip to resolve the silent data corruption (SDC) issues on its own. FIG. 1 depicts a block diagram of an example chip 100. A chip 100 can include one or more cores 110. For example, a TPU chip can include one or more tensor cores, the number of which varies depending on the version of the TPU chip. Each core 110 can include one or more processing units 170. For example, each tensor core can include a plurality of matrix-multiply units (MXUs) 140, 142, 144, and 146, vector units 130, and scalar units 120. MXUs 140, 142, 144, and 146 are one of the core components of the TPU chip 100, used to accelerate matrix multiplication operations. Matrix multiplication, a core operation in deep learning models, is parallelized through MXUs 140, 142, 144, and 146 to enhance processing speed. The vector unit 130 processes vector operations, typically used for tasks such as activation function computations or element-wise operations. The scalar unit 120 handles operations on scalar values, such as bias values, within the TPU chip 100.

Additionally, a TPU chip 100 can include high bandwidth memories (HBMs) 160. TPUs feature a memory interface for reading and writing input and output data. The memory interface allows a TPU chip 100 to load data from HBMs 160 and store computation results back to HBMs 160. Moreover, TPU chips 100 can include buses 150 for data transfer between different hardware units. Buses facilitate efficient data transmission among computation units, memory interfaces, network interfaces, and other hardware components, contributing to overall performance and efficiency improvements in TPU chips 100. TPU chip 100 combines these components to process and accelerate deep learning model computations efficiently. These components enable parallel processing of various operations within the model.

Figure 2:
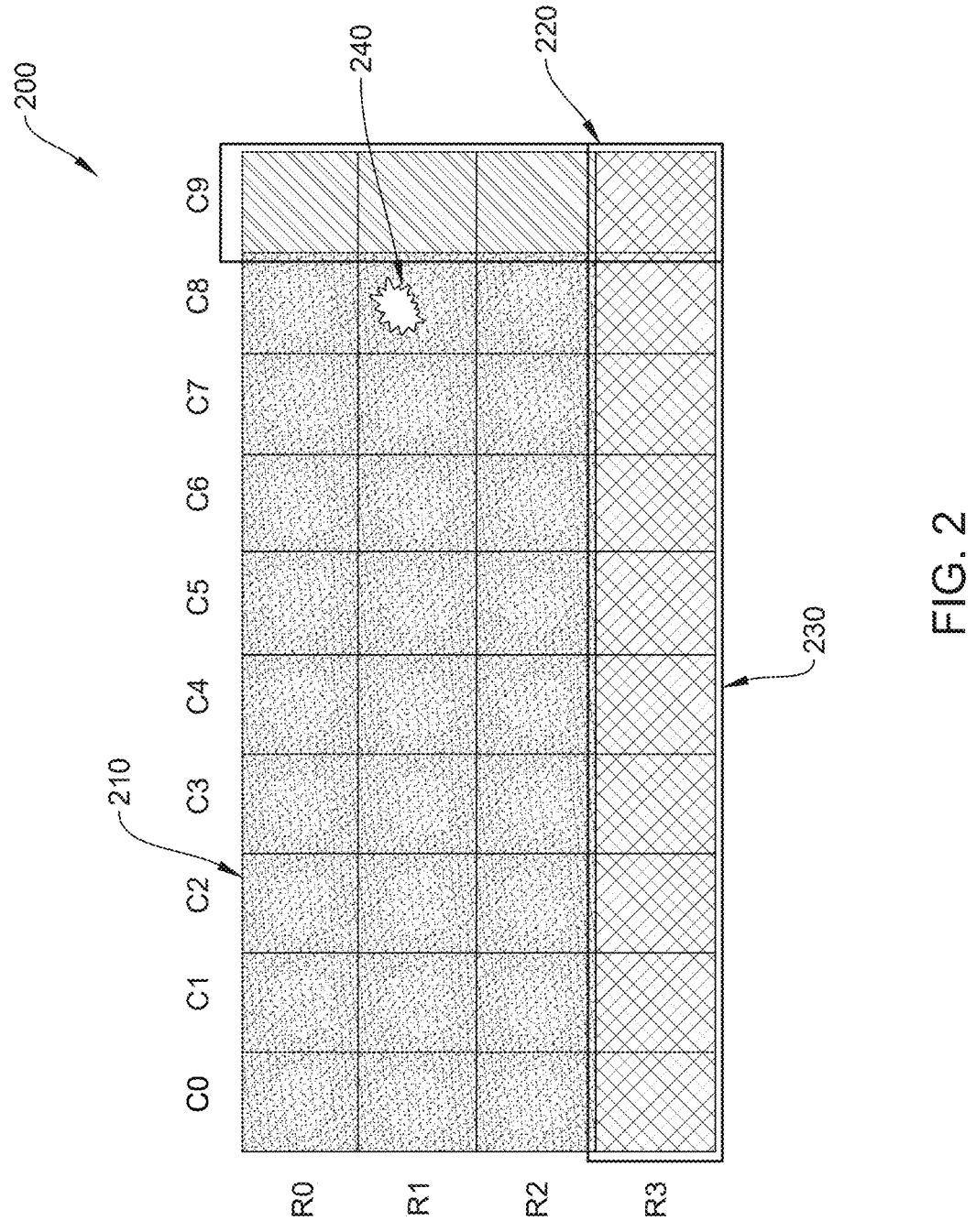
FIG. 2 depicts a block diagram of an example processing unit including a plurality of processing tiles according to aspects of the disclosure.

FIG. 2 depicts a block diagram of an example processing unit 200, such as the processing units 170 as depicted in FIG. 1. The processing unit 200 can include a plurality of processing tiles arranged in a data processing matrix 210. For example, a processing unit 200, such as MXU 140 or vector unit 130 is composed of multiply-accumulators in a systolic array. These multiply-accumulators are designed with data processing metrics 200 to perform matrix operations fast, rendering it ideal for machine learning workloads.

The data processing metrics 210 can be arranged in a plurality of rows R0, R1, R2, and R3 and columns C0, C2, C3, C4, C5, C6, C7, C8, and C9. For example, the data processing metrics 210 can include a plurality of processing tiles 0-26 organized in columns C0-C8 and rows R0-R2, as shown in FIG. 2. The processing unit 200 can further include at least one of the redundant rows or columns. As shown in block 220 and 230, at least one of the redundant rows or columns may be organized, for example, as column C9 and row R3. When data corruption occurs within a tile, a redundant row or column can effectively mask the corruption by substituting the affected tile. While one redundant row and column in FIG. 2 are shown at edges of the matrix of processing tiles, in other examples multiple redundant rows and/or columns may be present. Moreover, the redundant rows and/or columns may be positioned between functioning rows or columns, as opposed to being positioned at edges of the matrix.

When an SDC is detected, the processing core 210 can identify where the defect occurred. If the data corruption occurred in a tile located at row R3, column C8, redundant column C9 can be used to replace column C8 that includes the defective tile (R1, C8). Alternatively, redundant row R3 can be used to replace row R1 that includes the defective tile. To ensure that the repaired performance of the chip matches that of the original configuration, the new row or column should be logically remapped. The choice between a redundant row or column depends on factors such as silicon cost and implementation complexity. This redundancy mechanism maintains the integrity of the data and the overall functionality of the system, reducing the impact of corruption on system performance and reliability.

In this manner, the processor core can attempt to identify the defective tile and perform a soft repair or replacement procedure that identifies the defective tile and logically maps it to a redundant row or column. If uncertainty persists regarding the defective tile, multiple attempts may be made to address the issue. Once the soft repair or replacement operation is completed and the functionality of the chip is restored, the e-fuse of the chip can be blown to proceed with the hardware repair process. The e-fuse may be an on-chip programmable non-volatile storage. Once a defective portion of the logic is identified, the information of the defective portion of the logic is programmed in e-fuse. The information is transmitted to MXU or vector processing unit (VPU) and the MXU or VPU adjusts the functionality based on the new information. For example, upon powering up the chip, the information is read and decoded from the e-fuse and configured into the chip's operation, allowing it to bypass the defective portion.

Figure 3:
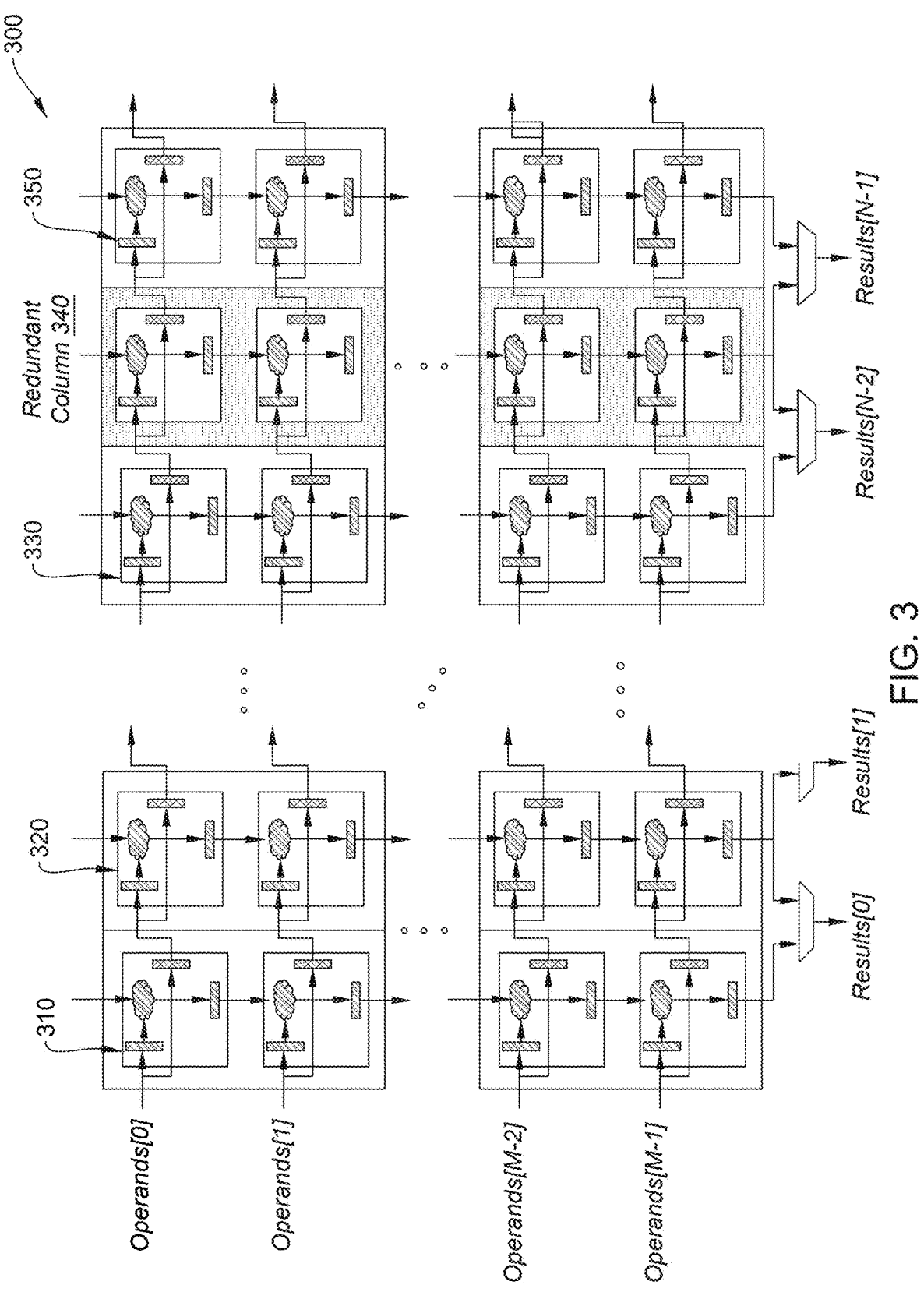
FIG. 3 depicts a block diagram of an example data processing matrix of the data processing unit according to aspects of the disclosure.

FIG. 3 depicts a block diagram of an example data processing matrix 300 of the data processing unit 200 as depicted in FIG. 2. Each tile in the matrix includes one or more logics for processing matrix multiplication operations. The multiplication result is computed by multiplying an input element with the corresponding weights of their respective one or more logics and is typically stored in an accumulator and added to the previous result. These processes are performed simultaneously to efficiently handle matrix multiplication operations. For example, tile 310 receives the input matrix and multiplies it by its corresponding weights to compute the result. The calculated result is then passed to tile 320, which multiplies its corresponding weights to calculate the result. The results are stored in an accumulator and added to the previous result.

When providing output to the next tile, the processing core 110 can determine whether the next tile is in a redundant row or column. If the next tile is in a redundant row or column, this redundant row or column is bypassed, and the output is provided to the next tile of the redundant row or column. For example, as shown in tile 330, after the logic performed in tile 330, the output is provided to the next tile. However, if the next tile is a redundant column 340, the redundant column 340 is skipped, and the result of the logic in tile 330 is provided to the next tile 350. The computations in the redundant column are disconnected, and the overall results of the computation are chosen only from valid tile.

Figure 4:
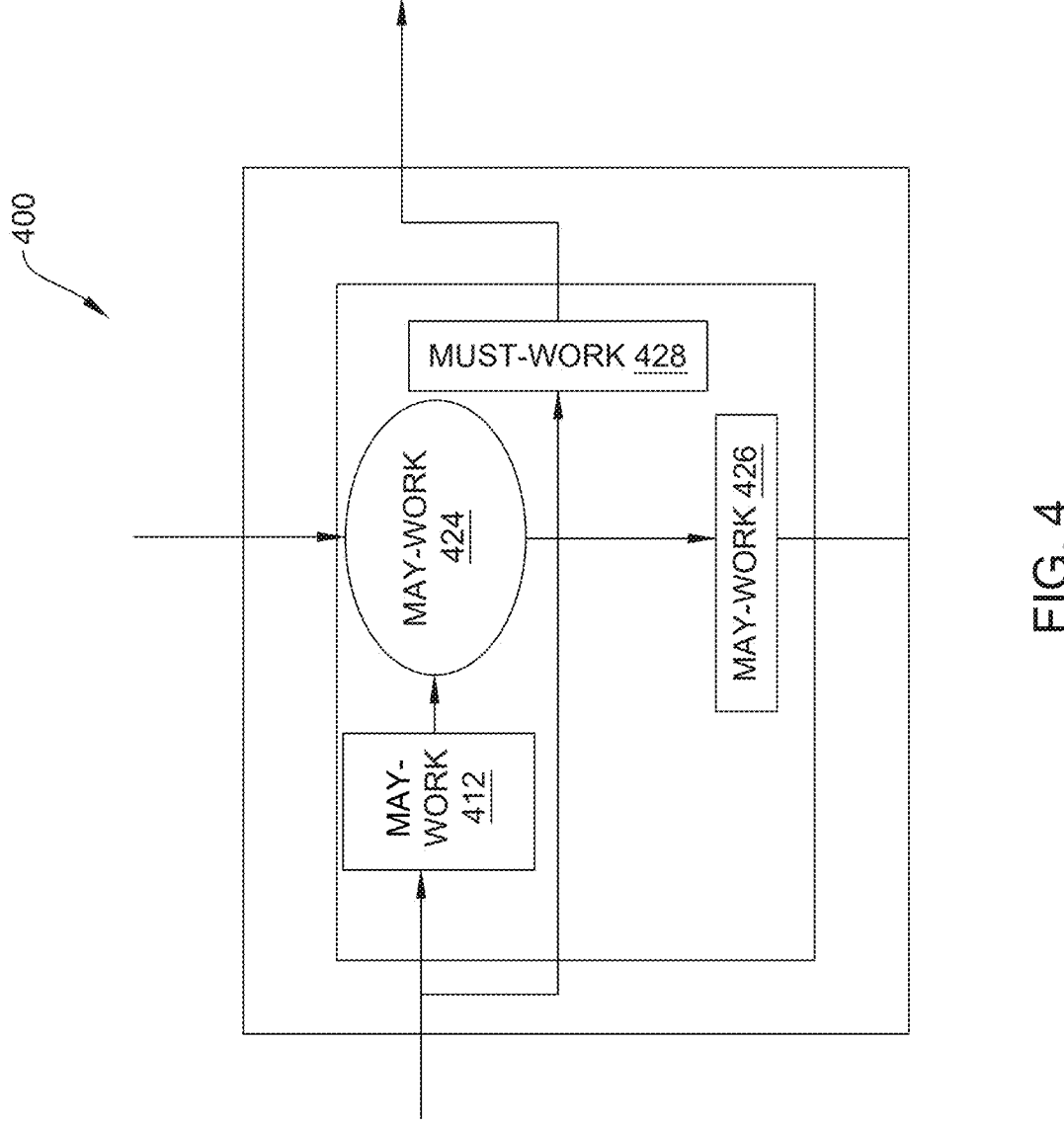
FIG. 4 depicts a block diagram of an example processing tile of the data processing matrix according to aspects of the disclosure.

FIG. 4 depicts a block diagram of an example processing tile 400 of the data processing matrix. A tile 400 can include one or more logic units. The processing core 210 can determine whether one or more logic units where the data corruption occurred are critical, or "must-work" for the chip to function, or whether the one or more logic units are auxiliary, or "may-work" but are not critical to the essential functions of the chip. If the data corruption occurs in the critical logic unit 428, the processing core 210 can be discarded. However, if the data corruption occurs in the auxiliary logic unit 412, 424, and 426, the processing core 210 can skip the auxiliary logic unit 412, 424, and 426 and move on to the next tile. In the case of data corruption in the auxiliary logic unit, the defective tile should be replaced with a redundant row or column.

The chip can be designed with minimal critical logic to increase the repairability of the chip, such that the number of auxiliary logic units in processing tile 400 is greater than the number of critical logic units. As shown in block 400, there is one critical logic unit 428 as compared to several auxiliary logic units 412, 424, and 426. Auxiliary logic units 412, 424, and 426 can account for the majority of the computation and the majority of the logic units in tile 400, while the critical logic unit 428 is a hard-core logic that carries less weight. If defects occur in the auxiliary logic units 412, 424, and 426, the auxiliary logic units 412, 424, and 426 can be repaired by using redundant rows or columns, allowing the chip to be repaired in most cases.

The critical logic unit 428 and the auxiliary logic units 412, 424, and 426 are executed independently of each other.

In the case of critical logic 428, the output of the critical logic unit 428 can serve as inputs not only for other critical logic units but also for auxiliary logic units 412, 424, and 426. However, in the case of the auxiliary logic units 412, 424, and 426, the output of the auxiliary logic units 412, 424, and 426 can only serve as inputs for other auxiliary logics 412, 424, and 426.

Figure 5:
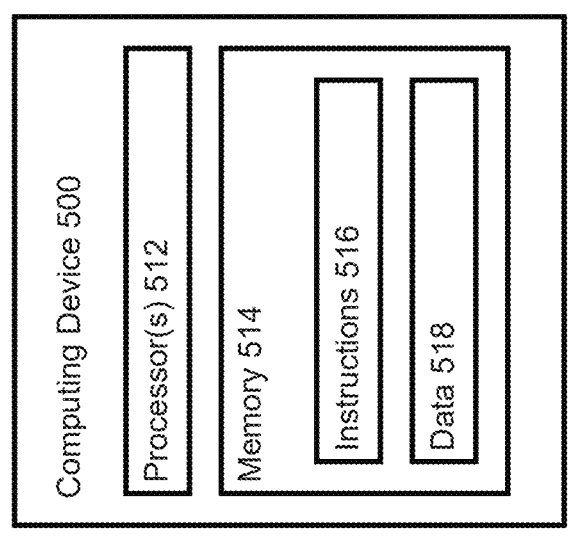
FIG. 5 depicts a block diagram of an example computing device implementing a self-repairable chip according to aspects of the disclosure.

FIG. 5 depicts a block diagram of an example computing device 500 implementing a self-repairable chip. For example, the computing device 500 can be the chip 200 described in FIG. 2. The self-repairable chip can be implemented on one or more devices having one or more processors, such as in computing device 500.

The computing device 500 can include one or more processors 512 and memory 514. The memory 514 can store information accessible by the processors 512, including instructions 516 that can be executed by the processors 512. The memory 514 can also include data 518 that can be retrieved, manipulated, or stored by the processor 512. The memory 514 can be a type of transitory or non-transitory computer readable medium capable of storing information accessible by the processors 512, such as volatile and non-volatile memory. The processors 512 can include one or more central processing units (CPUs), graphic processing units (GPUs), field-programmable gate arrays (FPGAs), and/or application-specific integrated circuits (ASICs), such as tensor processing units (TPUs).

The instructions 516 can include one or more instructions that, when executed by the processors 512, cause the one or more processors 512 to perform actions defined by the instructions 516. The instructions 516 can be stored in object code format for direct processing by the processors 512, or in other formats including interpretable scripts or collections of independent source code modules that are interpreted on demand or compiled in advance. The instructions 516 can include instructions for implementing a self-repairable chip 500. The self-repairable chip 500 can be executed using the processors 512, and/or using other processors remotely located from the computing device 500.

The data 518 can be retrieved, stored, or modified by the processors 512 in accordance with the instructions 516. The data 518 can be stored in computer registers, in a relational or non-relational database as a table having a plurality of different fields and records, or as JSON, YAML, proto, or XML documents. The data 518 can also be formatted in a computer-readable format such as, but not limited to, binary values, ASCII, or Unicode. Moreover, the data 518 can include information sufficient to identify relevant information, such as numbers, descriptive text, proprietary codes, pointers, references to data stored in other memories, including other network locations, or information that is used by a function to calculate relevant data.

Although FIG. 5 illustrates the processors 512 and the memories 514 as being within the computing device 500, components described herein, including the processors 512 and the memories 514 can include multiple processors and memories that can operate in different physical locations and not within the same computing device. For example, some of the instructions 516 and the data 518 can be stored on a removable SD card and others within a read-only computer chip. Some or all of the instructions 516 and data 518 can be stored in a location physically remote from, yet still accessible by, the processors 512. Similarly, the processors 512 can include a collection of processors that can perform concurrent and/or sequential operation. The computing devices 500 can include one or more internal clocks providing timing information, which can be used for time measurement for operations and programs run by the computing devices 500.

Although a single computing device 500 is shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

In addition to the systems described above, various methods which may be executed using the above systems are now described. While the operations of such methods are described in a particular order, it should be understood that the order may be modified and that some operations may be executed partly or wholly in parallel with other operations. Moreover, operations may be added or omitted.

FIG. 6 depicts a flow diagram of an example processing for repairing SDC issues via a self-repairable chip. The example process 600 can be performed by a processing core 110 on a processing device, such as chip 100 as depicted in FIG. 1. The example process 600 can be performed in the manufacturing state or in data center.

As shown in block 610, the processing core 110 can be configured to detect data corruption in the data processing matrix of the data processing unit. Given the inherent challenge of detecting SDC, additional steps can be taken at various stages, such as during fabrication or utilization in fields like data centers, to detect SDC.

Upon detecting SDC, as shown in block 620, the processing core 110 can be configured to identify a defective tile of the data processing matrix where the data corruption occurred. In the wafer test or system in package (SiP) manufacturing processes, the identification of a defective tile is detected by utilizing an employee designed for test (DFT) based chip probing (CP) and automated test equipment (ATE) programs. These programs enable the precise pinpointing of defect locations. The processing core 110 can identify the location of the data processing matrix where the data corruption occurred through these programs. For example, the data processing core 110 can be configured to determine a row and a column of the defective tile in the data processing matrix.

In system board manufacturing, functional tests tailored for SDC detection are executed. These tests can generate substantial data traffic and establish numerous checkpoints throughout the data path. Data mismatches can signal a probable defect within the most recent data processing unit. In data centers, perform functional tests during intervals between customer works or when machines are idle to detect SDCs. If an SDC defect is detected and there is available redundancy, an automated repair process may be initiated. After repair, the same functional tests are performed again and release the machine upon successful completion.

As shown in block 630, the processing core 110 can be configured to determine whether one or more logic units in the defective tile may work or must work. Each processing tile within the data processing matrix can be configured to execute one or more logics, such as multiplication operations. Matrix data enters each tile as input, where the tile performs the one or more logics by multiplying the input with the weights of the one or more logics to generate an output. The generated output is then provided as input to the next tile. Each processing tile can include one or more critical logics or auxiliary logics. Critical logics and auxiliary logics are independent of each other. The output of the critical logic can serve as input for all logics, while the output of the auxiliary logic can only serve as input for the auxiliary logic.

The processing core 110 determines whether the one or more logics where the data corruption occurred in the defective tile are critical or auxiliary. If it is determined that the logic where the data corruption occurred is a critical logic, the chip is discarded. However, if it is determined that the logic where the data corruption occurred is an auxiliary logic, the auxiliary logic is skipped, and the next logic is carried out.

As shown in block 640, the processing core 110 can be configured to replace the defective tile with at least one of the redundant rows or columns. When the processing core 110 determines that the logic where the data corruption occurred is an auxiliary logic, the defective tile can be repaired by replacing the defective tile with at least one of the redundant rows or columns. At the identified location of the defective tile within the data processing matrix, an entire row can be substituted with a redundant row, or an entire column can be substituted with a redundant column. The processing core 110 may logically remap the redundant row or column to perform the original operations. Moreover, the processing core 110 may be further configured to run testing on the repaired matrix after replacing the defective core and logically remapping the matrix. Such testing may confirm whether the chip is fully functional. In some examples, repairing the defective tile may include blowing an e-fuse. Blowing the e-fuse may be a hard repair that finalizes the logic remapping performed by the processing core 110.

Additionally, the processing core can include numerous long and wide data buses, such as a bus 150 as depicted in FIG. 1. The data buses are susceptible to wafer foundry back-end defects leading to SDC. However, in case of such defects, a redundant bus or a redundant partial bus can be employed to replace the defective bus and restore chip functionality. These processing units, including buses, have a significant number of identical tiles, allowing one or more redundant rows or columns to effectively cover a large area of tiles in the event of a random defect occurring in the data processing matrix.

SDC repair can be performed at various stages, including during accelerator chip manufacturing, AI/ML machine assembly, or in the field such as data centers. This approach is cost-effective because it eliminates the need to send defective chips back to the manufacturing process for repair. Defective chips can be repaired on-site, improving the yield in the manufacturing process. Repairs for SDC can be performed multiple times over the lifetime of a chip. Depending on the level of design redundancy, repair may initially occur during manufacturing, followed by subsequent repairs in data centers years later if the chip experiences SDC again due to aging.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A device comprising:
one or more processing cores of a self repairable chip, the one or more processing cores further comprising a plurality of processing units, at least one of the plurality of processing units comprising a data processing matrix arranged in a plurality of rows and columns, the data processing matrix including at least one of a redundant column or a redundant row of processing units, the processing core configured to:
detect data corruption in the data processing matrix;
identify a row and a column of a defective tile of the data processing matrix where the data corruption occurred, the defective tile comprising at least one critical logic unit required for the self-repairable chip to function and a plurality of auxiliary logic units that are not required for the self-repairable chip to function;
determine whether a defective logic unit in the defective tile is the at least one critical logic unit or one of the plurality of auxiliary logic units; and
when the defective logic unit is one of the auxiliary logic units, replace the defective tile with one of the redundant column or the redundant row,
wherein a number of the plurality of auxiliary logic units in the defective tile is greater than a number of the at least one critical logic unit to increase the reparability of the self repairable chip, and a majority of logic units in the defective tile are the plurality of auxiliary logic units.

2. The device of claim 1, wherein the one or more processing cores are further configured to determine whether there is an available redundant column or redundant row and automatically replace the defective tile with the available redundant column or a redundant row.

3. The device of claim 2, wherein the one or more processing cores are further configured to remap a logic in the data processing matrix after replacing the defective tile with the available redundant column or row.

4. The device of claim 3, wherein the one or more processing cores are further configured to run testing after remapping the logic in the data processing matrix, and confirm based on the testing whether the data processing matrix is fully functional.

5. The device of claim 1, wherein the one or more processing cores are further configured to restore functionalities of the defective tile by blowing an e-fuse of the device.

6. The device of claim 1, wherein the one or more processing cores are further configured to:
execute one or more logic units in a processing tile of the data processing matrix;
determine whether the next processing tile is a tile of the redundant row or column; and
execute one or more logics in a next processing tile of the tile of the redundant row or column by bypassing the tile of the redundant row or column when the next processing tile is determined the tile of the redundant row or column.

7. The device of claim 1, wherein the at least one critical logic unit and the plurality of auxiliary logic units perform independently.

8. The device of claim 1, the device further comprising a plurality of bus and redundant bus.

9. The device of claim 8, the processing core further configured to replace a defective bus with the redundant bus when the defective bus is detected.

10. The device of claim 1, wherein the one or more processing cores are configured to repair the defective tile multiple times during a lifetime of a processing core.

11. The device of claim 1, wherein the one or more processing cores are configured to identify the defective tile of the data processing matrix by receiving information of the defective tile from tests for detection of silent data corruptions (SDCs).

12. The device of claim 1, wherein the data corruption is detected by one or more functional tests.

13. A method for repairing data corruption on a device having a self-repairable chip, the method comprising:
detecting, by one or more processing cores comprising a plurality of processing units, the data corruption in a data processing matrix of at least one of the plurality of processing units, wherein the data processing matrix is arranged in a plurality of rows and columns and the data processing matrix includes at least one of a redundant column or a redundant row of processing units;
identifying, by one or more processing cores, a defective tile of the data processing matrix where the data corruption occurred, the defective tile comprising at least one critical logic unit required for the self-repairable chip to function and a plurality of auxiliary logic units that are not required for the self-repairable chip to function;
determining, by one or more processing cores, whether a defective logic unit in the defective tile is the at least one critical logic unit or one of the plurality of auxiliary logic units; and
replacing, by one or more processing cores, the defective tile with one of the redundant column or the redundant row when the defective logic unit is the auxiliary logic unit,
wherein a number of the plurality of auxiliary logic units in the defective tile is greater than a number of the at least one critical logic unit to increase the reparability of the self-repairable chip, and wherein a majority of logic units in the defective tile is the plurality of auxiliary logic units.

14. The method of claim 13, the method further comprising determining whether there is an available redundant column or redundant row, and automatically repairing the defective tile with the available redundant column or redundant row.

15. The method of claim 13, the method further comprising restoring functionalities of the defective tile by blowing an e-fuse of the device.

16. The method of claim 13, the method further comprising:

executing, by one or more processing cores, one or more logics in a processing tile of the data processing matrix;

determining, by one or more processing cores, whether the next processing tile is a tile of the redundant row or column; and executing, by one or more processing cores, one or more logics in a next processing tile of the tile of the redundant row or column by bypassing the tile of the redundant row or column when the next processing tile is determined the tile of the redundant row or column.

17. The method of claim 13, wherein the at least one critical logic units and the plurality of auxiliary logic units perform independently.

18. The method of claim 13, wherein the device further comprises a plurality of bus and redundant bus.

19. The method of claim 18, the method further comprising replacing a defective bus with the redundant bus when the defective bus is detected.

20. The method of claim 13, wherein the replacing the defective tile with one of the redundant column or the redundant row is performed multiple times during a lifetime of a processing core.

21. The method of claim 13, wherein the identifying the defective tile of the data processing matrix comprises receiving information of the defective tile from tests for detection of silent data corruptions (SDCs).

22. The method of claim 13, wherein the data corruption is detected by one or more functional tests.

\* \* \* \* \*